(12) United States Patent
Michalec

(10) Patent No.: US 7,984,789 B2
(45) Date of Patent: Jul. 26, 2011

(54) OBSERVATION STAND

(76) Inventor: John Michalec, Boerne, TX (US)

(*) Notice: Subject to any disclaimer, the term of this patent is extended or adjusted under 35 U.S.C. 154(b) by 542 days.

(21) Appl. No.: 11/691,216

(22) Filed: Mar. 26, 2007

(65) Prior Publication Data

US 2008/0223658 A1    Sep. 18, 2008

Related U.S. Application Data

(60) Provisional application No. 60/894,857, filed on Mar. 14, 2007.

(51) Int. Cl.
  *A01M 31/00* (2006.01)
(52) U.S. Cl. ........................................ 182/115
(58) Field of Classification Search .................. 182/125, 182/115
  See application file for complete search history.

(56) References Cited

U.S. PATENT DOCUMENTS

| | | | | |
|---|---|---|---|---|
| 581,376 | A * | 4/1897 | Simpson | 47/39 |
| 3,220,766 | A * | 11/1965 | Kates | 297/184.16 |
| 3,967,694 | A * | 7/1976 | Woolfolk, Sr. | 182/82 |
| 4,159,113 | A * | 6/1979 | Callecod | 482/36 |
| 4,378,100 | A * | 3/1983 | Minozzi et al. | 248/168 |
| 5,009,283 | A | 4/1991 | Prejean | |
| 5,409,081 | A * | 4/1995 | Reeves | 182/63.1 |
| 5,927,435 | A | 7/1999 | Benton | |
| 6,053,282 | A * | 4/2000 | Morisak | 182/115 |
| 6,572,061 | B2 * | 6/2003 | Overbeck | 248/188.6 |
| 6,711,993 | B2 * | 3/2004 | Robertson | 99/448 |
| 6,725,970 | B2 | 4/2004 | Garofalo | |
| 6,739,428 | B1 * | 5/2004 | Holmes et al. | 182/127 |
| 6,948,587 | B2 | 9/2005 | Griffiths | |
| 7,418,907 | B2 * | 9/2008 | Haimoff | 108/91 |
| 7,513,470 | B2 * | 4/2009 | Lomberk | 248/177.1 |
| 2002/0074030 | A1 | 6/2002 | Raines et al. | |

* cited by examiner

*Primary Examiner* — Alvin C Chin-Shue
(74) *Attorney, Agent, or Firm* — Christopher Wood; Daniel Eisenberg; Premier Law Group, PLLC

(57) ABSTRACT

An observation stand. In one non-limiting embodiment the observation stand includes a support base, a seat, a platform, and a safety-framework. The support base defines opposite top and bottom ends and first, second and third legs configured in a tripod arrangement. The legs each define an upper end and a bottom end. The seat is attached to, and hence supported by, the upper end of each leg. The platform comprises first, second and third slots. The slots are arranged to respectively accommodate the upper ends of the first, second and third legs. The platform is located proximate to the top end of the support base and below the seat. The platform defines a perimeter. The safety-framework is attached to the perimeter, and helps prevent a user from falling off the platform. An optional ground spike can be fitted to one or more of the legs.

3 Claims, 8 Drawing Sheets

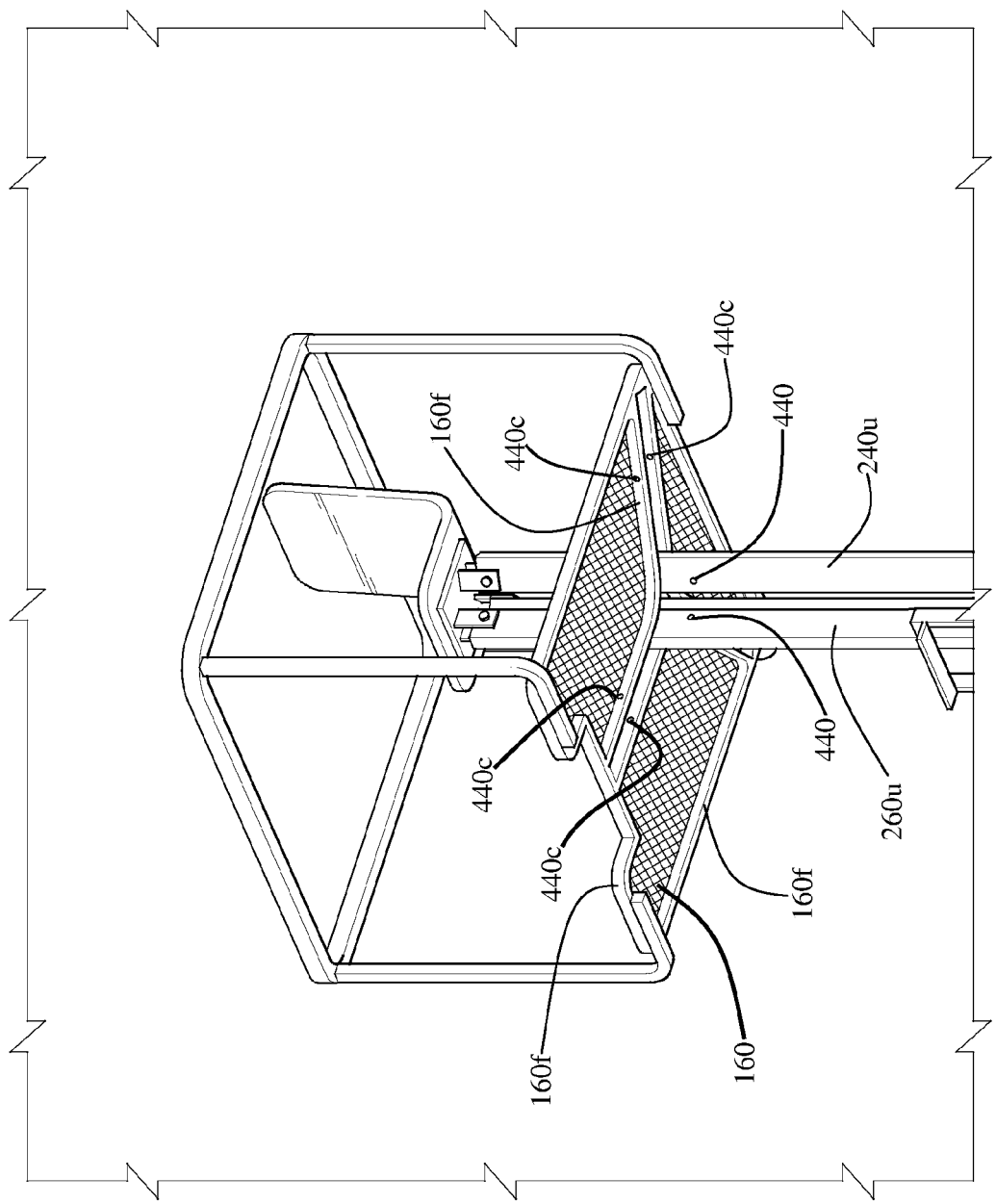

OBSERVATION STAND

CROSS-REFERENCE TO RELATED APPLICATIONS

This application claims the benefit of priority from U.S. Provisional Patent Application Ser. No. 60/894,857, filed Mar. 14, 2007, the entire contents of which are incorporated herein by reference.

STATEMENT REGARDING FEDERALLY SPONSORED RESEARCH OR DEVELOPMENT

Not Applicable.

FIELD OF THE INVENTION

The present invention relates to stands used to observe animals such as wild game.

BACKGROUND OF THE INVENTION

As noted in U.S. Pat. No. 5,009,283, elevated stands play a crucial role in hunting and observing game such as wild deer. An elevated stand typically increases the territory that a hunter or wild game observer, such as a park ranger, can keep under surveillance. The senses of most wild game, and especially deer, are attuned to dangers at ground level and, therefore, an observer or hunter perched above ground level is less likely to be detected by deer and other wild game.

U.S. Pat. No. 5,927,435, issued Jul. 27, 1999 to Benton, describes an observation and hunting stand with safety platform for preventing accidental falls from such stands, particularly tripod supported stands. The inventive device includes a tripod support base supported by the ground, and a platform attached to an upper end of the tripod support base. The platform includes a pivoting door formed therein that pivots between open and closed positions to permit ingress into, and egress from, the platform. In the closed position of the door, the platform is substantially solid with no openings therein, to prevent falls from the platform. The door is trapezoidal in shape with a wide end thereof adjacent the edge of the platform to allow passage of a person. In the open position of the door, the door rests against a seat support post, thus defining a stop for the door.

U.S. Pat. No. 4,699,248, issued Oct. 13, 1987 to Roy, describes an observation stand has a rectangular platform acting as a floor and removably secured, at its center, at the upper end of a mast. The latter is made up of a series of cylindrical tubes having generally the same length but decreasing in diameter, from one tube to the next, in order that the tubes may be slid one into the other with, of course, the larger tube on the outside. The mast is mounted by its base on a stake, driven into the ground, by means of a device which allows the mast to pivot with respect to the stake so that the stand may be completely mounted when lying over the ground before being straightened up into vertical position and then fixed in that vertical position. The mast is provided with removable rungs capable of giving access to a trap-door formed on the very platform. The latter is surrounded by a removable guard wall.

U.S. Pat. No. 5,009,283, issued Apr. 23, 1991 to Prejean, describes a hunting stand that can be supported by a tree, ladder or tripod. The '283 stand has a collapsible seat assembly which serves as a foot bar when used as a climbing stand. Adjustable arms may be used as a component of the climbing bar assembly or when a ladder is connected to the front of the stand, the arms may be used to brace the ladder. Instead of supporting the back end of the stand against a tree, tripod legs may be inserted into sockets in the stand.

U.S. Pat. No. 6,725,970, issued Apr. 27, 2004 to Garofalo, describes a describes "Stability Alignment Frame" or "STAF" useful for the erection of an observation or hunting stand includes a plurality of vertical posts. A horizontal framework interconnects adjacent posts and a leg is secured to an associated vertical post. Each leg extends downwardly and outwardly. A first stabilizing member interconnects non-adjacent, opposed legs, thereby providing a plurality of interconnected legs. Structure is provided for applying a force to the interconnected legs to change the spacing between the bases of a pair of the interconnected legs, thereby providing a wedging action between the stability alignment frame and an elevated vantage point. This provides a stable base for supporting the elevated vantage point. The embodiment shown in FIG. 7 and FIG. 8A and FIG. 8B has four legs; however, it is possible for the STAF to have only three legs, analogous to a tripod (column 11, lines 58-60).

U.S. Pat. No. 6,948,587, issued Sep. 27, 2005 to Griffiths, describes an elevated platform configurable for use in cooperation with a tree or pole, or as a free-standing unit. The '587 device includes a triangular assembled configuration (see Abstract on the front page), which an Examiner will likely interpret as a tripod. The '587 device includes a platform which is adapted to receive and secure a seat (column 5, lines 13-14).

U.S. Patent Publication Number 20020074030, published Jun. 20, 2002 to Raines et al., describes a cover for a hunting stand that can be removably attached to an existing hunting stand such as a tripod hunting stand which comprises an upper hunting stand mounted on a tripod set of legs.

All the above referenced U.S. patents are incorporated by reference herein in their entirety.

None of the above inventions and patents, taken either singly or in combination, is seen to describe the instant invention as claimed.

SUMMARY OF THE INVENTION

An observation stand. In one non-limiting embodiment the observation stand includes a support base, a seat, a platform, and a safety-framework. The support base defines opposite top and bottom ends and first, second and third legs configured in a tripod arrangement. The legs each define an upper end and a bottom end. The seat is attached to, and hence supported by, the upper end of each leg. The platform comprises first, second and third slots. The slots are arranged to respectively accommodate the upper ends of the first, second and third legs. The platform is located proximate to the top end of the support base and below the seat. The platform defines a perimeter. The safety-framework is attached to the perimeter, and helps prevent a user from falling off the platform. An optional ground spike can be fitted to one or more of the legs.

BRIEF DESCRIPTION OF THE DRAWINGS

FIG. 8 is a partial perspective view of an observation stand according to the present invention.

Similar reference characters denote corresponding features consistently throughout the attached drawings.

DETAILED DESCRIPTION OF THE INVENTION

Figure 1:
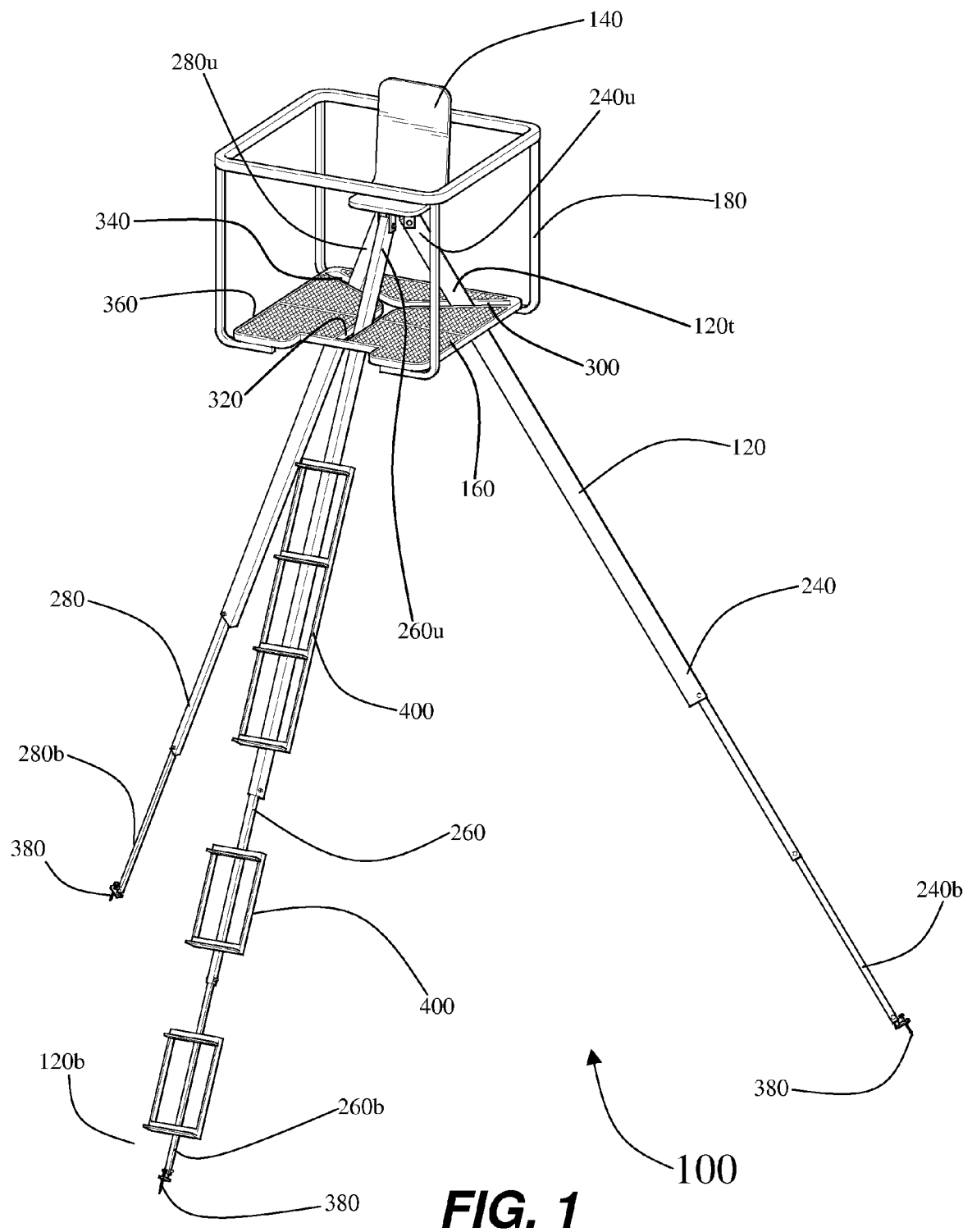
FIG. 1 is a perspective view of an observation stand according to the present invention.

The present invention is directed to an observation stand that can be used to observe wild game. The observation stand of the present invention is denoted generally by the numeric label "100".

Referring to the Figures in general, the observation stand 100 includes a support base 120, a seat 140, a platform 160, and a safety-framework 180. The support base 120 has a top end 120*t* and a bottom end 120*b* and comprises first 240, second 260 and third 280 legs. The legs 240 through 280 of the support base 120 are configured in a tripod arrangement. The legs 240 through 280 respectively comprise upper ends 240*u* through 280*u*, and bottom ends 240*b* through 280*b* (e.g., see FIG. 1). The seat 140 is attached to, and hence supported by, the upper end of each leg; more specifically, the seat is attached to and supported by upper ends 240*u*, 260*u* and 280*u* of legs 240, 260 and 280, respectively.

The platform 160 comprises first, second and third slots 300, 320 and 340, respectively. The slots 300, 320 and 340 are arranged to respectively accommodate the upper ends 240*u*, 260*u* and 280*u* of legs 240, 260 and 280, respectively. More specifically, the upper parts 240*u*, 260*u* and 280*u* of legs 240, 260 and 280 respectively pass through slots 300, 320 and 340 to attach to seat 140. Still more specifically, the slots 300, 320 and 340 are located in the same plane and intersect to form an incenter 350 (see FIGS. 5 and 7). The slots 300, 320 and 340 are arranged in the same fashion as three bisectors of the interior angles of a triangle and are thus able to accommodate the upper ends 240*u*, 260*u* and 280*u* of tripod legs 240, 260 and 280, respectively. In one embodiment, the platform comprises a platform-framework 160*f* (see, e.g., FIG. 7).

The platform 160 is located proximate to the top end 120*t* of support base 120 but below the seat 140. The platform 160 defines perimeter 360. The safety-framework 180 is attached to the perimeter 360, and helps prevent a user from falling off the platform 160. An optional ground spike 380 can be fitted to one or more of the bottom ends 240*b* through 280*b*. The optional ground spikes 380 enable the bottom ends 240*b* through 280*b* to be securely attached to the ground.

Referring to FIG. 1, the first 240, second 260 and third 280 legs are shown made up of second telescoping tubes thereby allowing the observation stand 100 to be compressed to a shorter length for storage and easy transport. More specifically, the first 240, second 260 and third 280 legs can be made up of a series of tubes having generally the same length but decreasing in diameter, from one tube to the next, in order that the tubes may be slid one into the other with the larger tube on the outside. For example, the first 240, second 260 and third 280 legs in FIG. 1 are shown made up of a series of tubes of decreasing diameter from one tube to the next to enable the tubes to slid one into the other with the larger tube on the outside. Telescoping legs are well known and are described, for example, in U.S. Pat. No. 4,699,248 issued Oct. 13, 1987 to Roy. U.S. Pat. No. 4,699,248 is herein incorporated by reference in its entirety.

Still referring to FIG. 1, a set of climbing steps 400 is optionally fitted to at least one leg to allow a user to climb to platform 160. More specifically, a set of climbing steps is shown fitted to leg 260. It will be understood that any suitable climbing means can be fitted to one or more of the legs 240 through 280. Alternatively, the climbing steps 400 could be regarded as an optional feature and a ladder (not shown) used to allow a user to climb to the platform 160.

Figure 2:
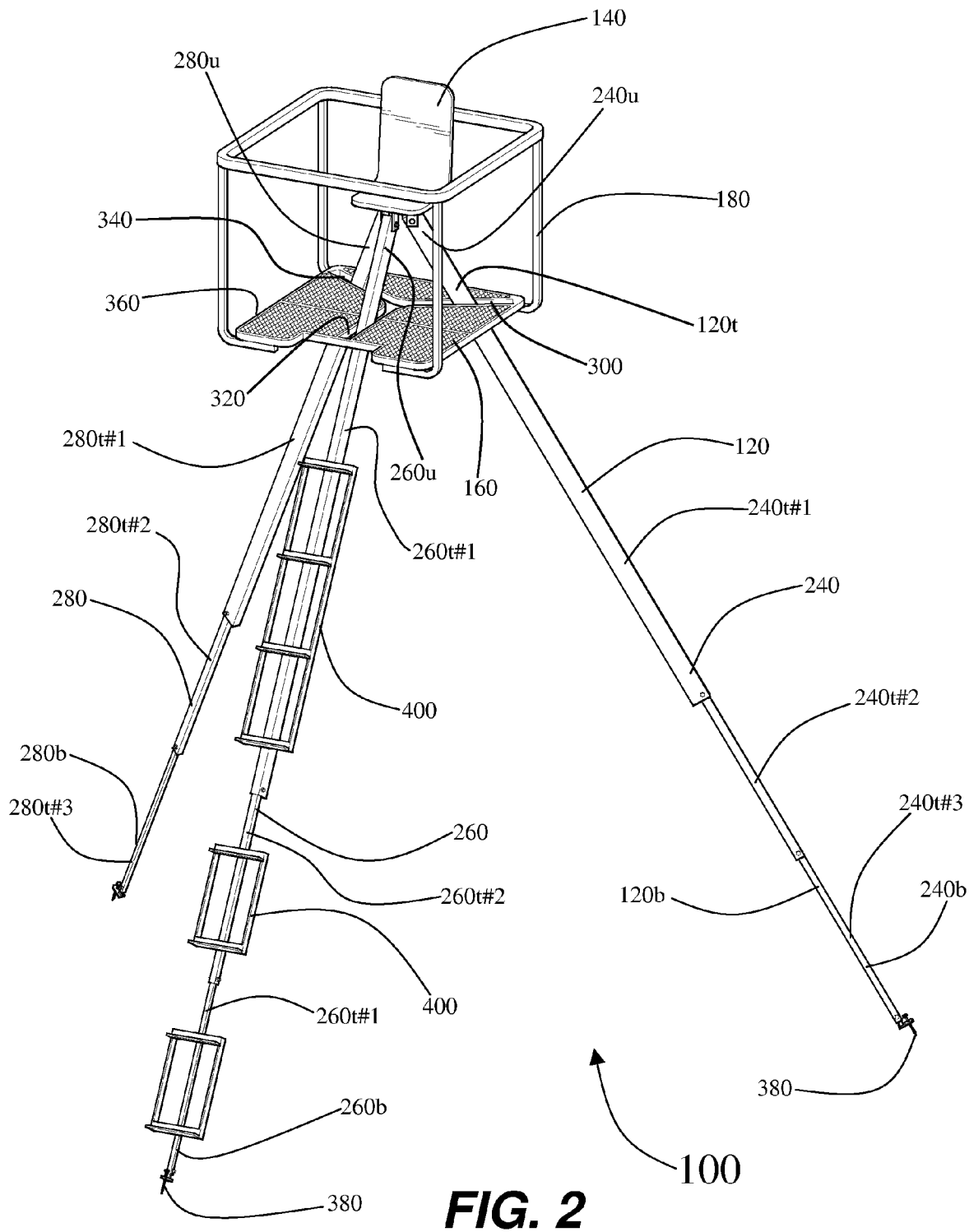
FIG. 2 is a perspective view of an observation stand according to the present invention.

With respect to FIG. 2, leg 240 is shown made up of tubes 240*t*#1 through 240*t*#3; leg 260 is shown made up of tubes 260*t*#1 through 260*t*#3; and leg 280 is shown made up of tubes 280*t*#1 through 280*t*#3. The tubes can have any suitable length and cross-section shape. Examples of possible cross-section shapes for the tubes include, but are not limited to tubes having a circular cross-section shape, square cross-section shape, rectangular cross-section shape or any other regular polygonal cross-section shape. The largest diameter tubes are: 240*t*#1, 260*t*#1 and 280*t*#1; the smallest diameter tubes are: 240*t*#3, 260*t*#3 and 280*t*#3; and the middle diameter tubes are: 240*t*#2, 260*t*#2 and 280*t*#2.

Figure 3:
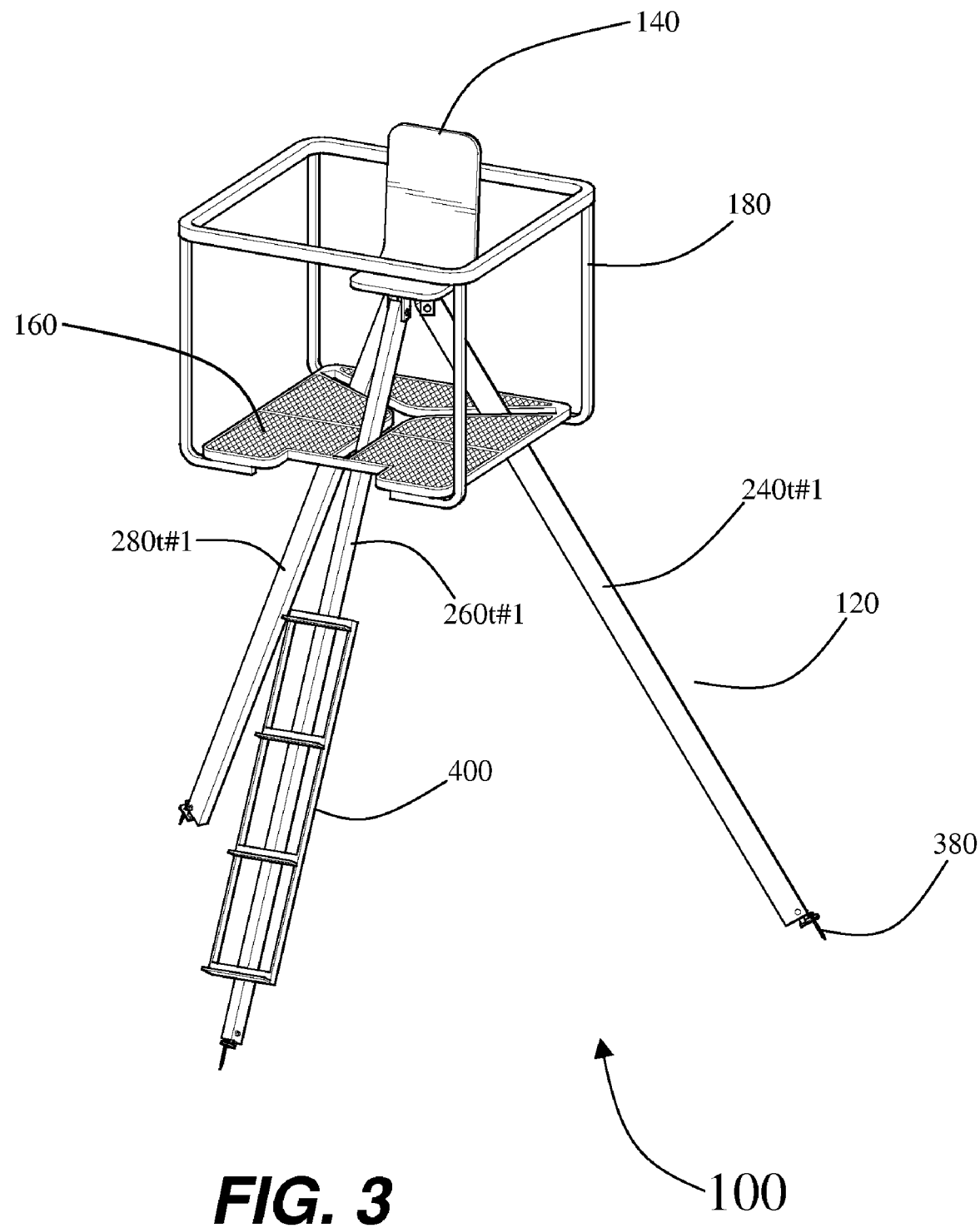
FIG. 3 is a perspective view of an observation stand according to the present invention.

FIG. 3 shows the observation stand 100 of FIG. 2 with tube 240*t*#3 telescoped into tube 240*t*#2, and tube 240*t*#2 (and by default, tube 240*t*#3) telescoped into tube 240*t*#1; tube 260*t*#3 telescoped into tube 260*t*#2, and tube 260*t*#2 (and by default, tube 260*t*#3) telescoped into tube 260*t*#1; and tube 280*t*#3 telescoped into tube 280*t*#2, and tube 280*t*#2 (and by default, tube 280*t*#3) telescoped into tube 280*t*#1. Hence, tubes 240*t*#3, 240*t*#2, 260*t*#3, 260*t*#2, 280*t*#3, and 280*t*#2 are hidden from direct view.

Figure 4:
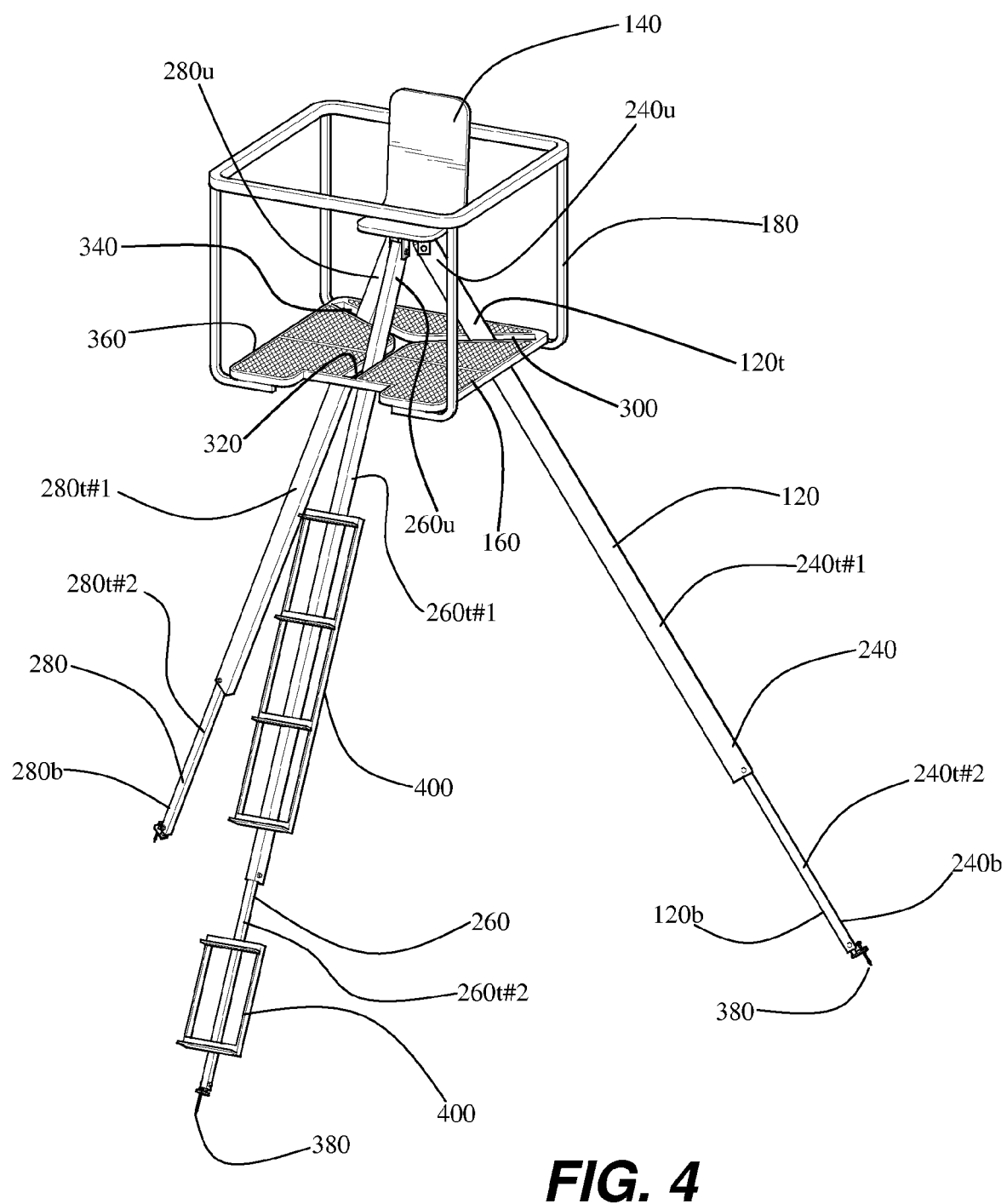
FIG. 4 is a perspective view of an observation stand according to the present invention.

FIG. 4 shows a variation of the observation stand 100 of wherein first, second and third legs 240, 260 and 280, respectively, each comprise two tubes instead of three tubes as shown in FIGS. 1 and 2. More specifically, first leg 240 comprises tube sections 240*t*#1 and 240*t*#2; second leg 260 comprises tube sections 260*t*#1 and 260*t*#2; and third leg 280 comprises tube sections 280*t*#1 and 280*t*#2. Thus, it should be understood by a person of ordinary skill in the art that the legs could comprise a varying number of tubes and each leg may comprise just one tube or a plurality of tubes.

Figure 5:
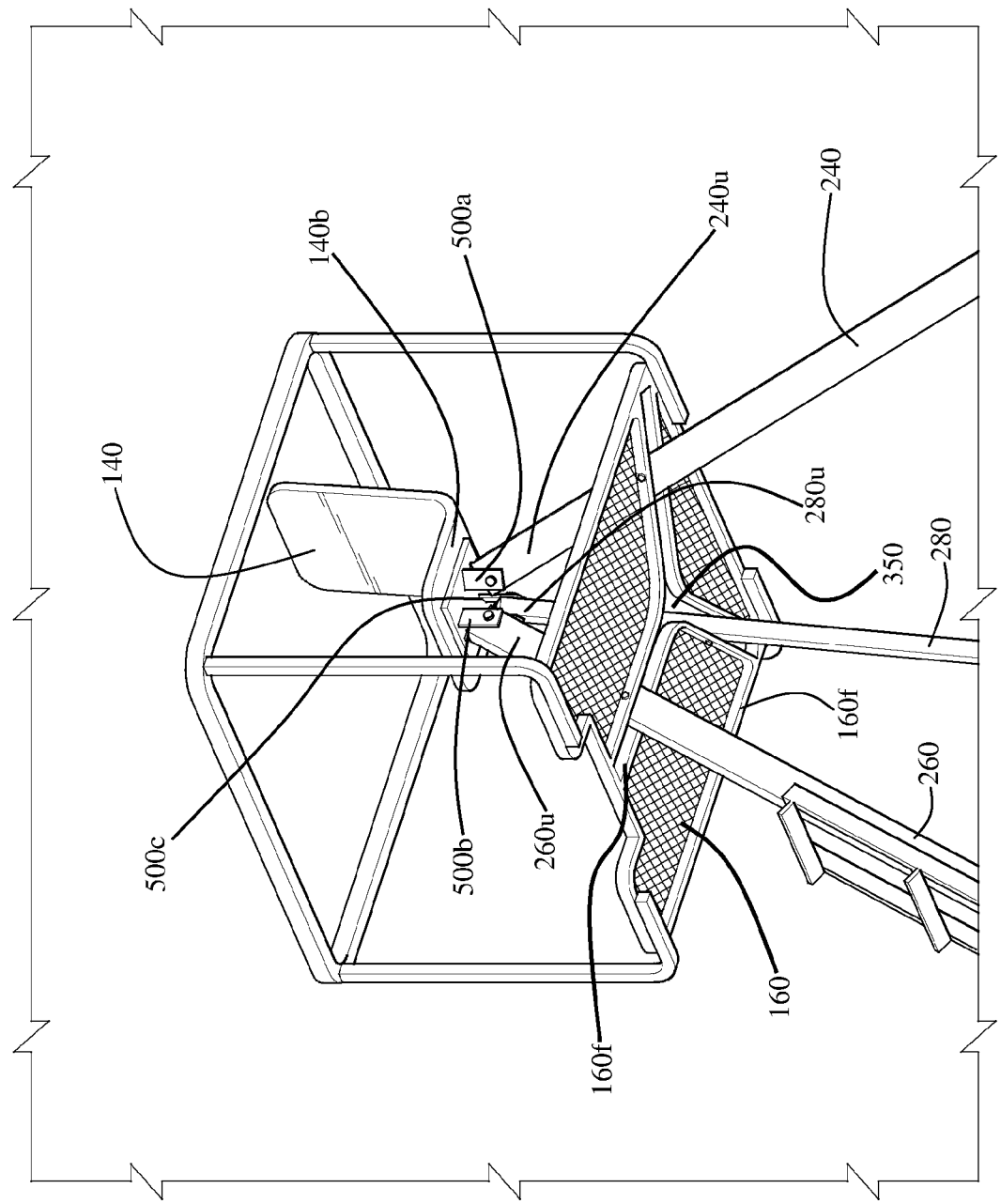
FIG. 5 is a partial perspective view of an observation stand according to the present invention.
Figure 6:
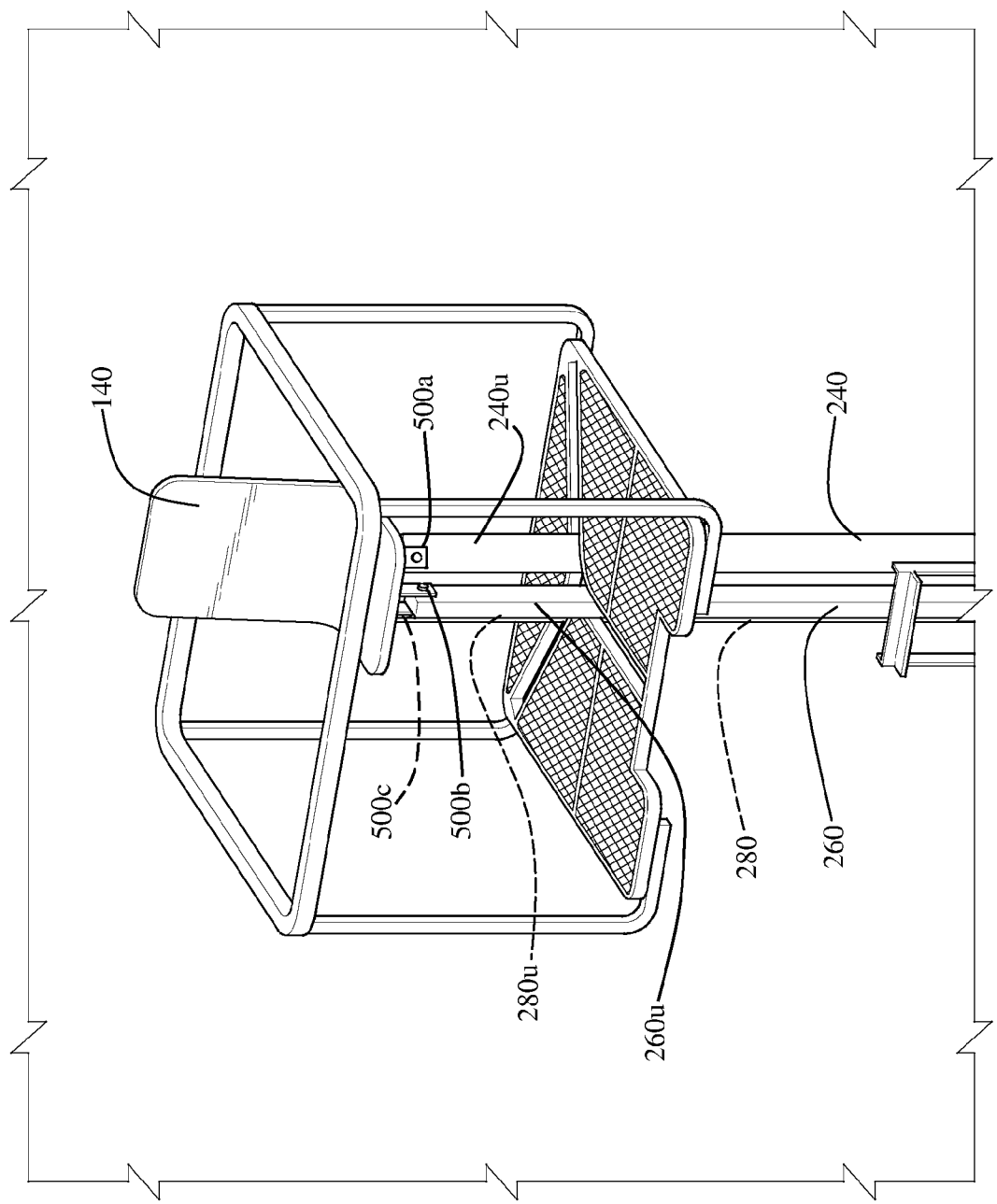
FIG. 6 is a partial perspective view of an observation stand according to the present invention.

As should be clear from comparing FIGS. 5 and 6, the first 240, second 260 and third 280 legs can be folded inwards. More specifically, first 500*a*, second 500*b* and third 500*c* seat-leg hinges respectively attach seat bottom 140*b* of seat 140 to the upper ends of legs 240, 260 and 280. Conversely, seat-leg hinge 500*a* attaches upper leg section 240*u* to seat bottom 140*b* of seat 140; seat-leg hinge 500*b* attaches upper leg section 260*u* to seat bottom 140*b* of seat 140; and seat-leg hinge 500*c* attaches upper leg section 280*u* to seat bottom 140*b* of seat 140. The legs 240, 260 and 280 can be folded inwards as shown in FIG. 6. In one aspect of the invention legs 240, 260 and 280 can be unbolted respectively from first 500*a*, second 500*b* and third 500*c* seat-leg hinges to allow for easy transport and/or storage.

Figure 7:
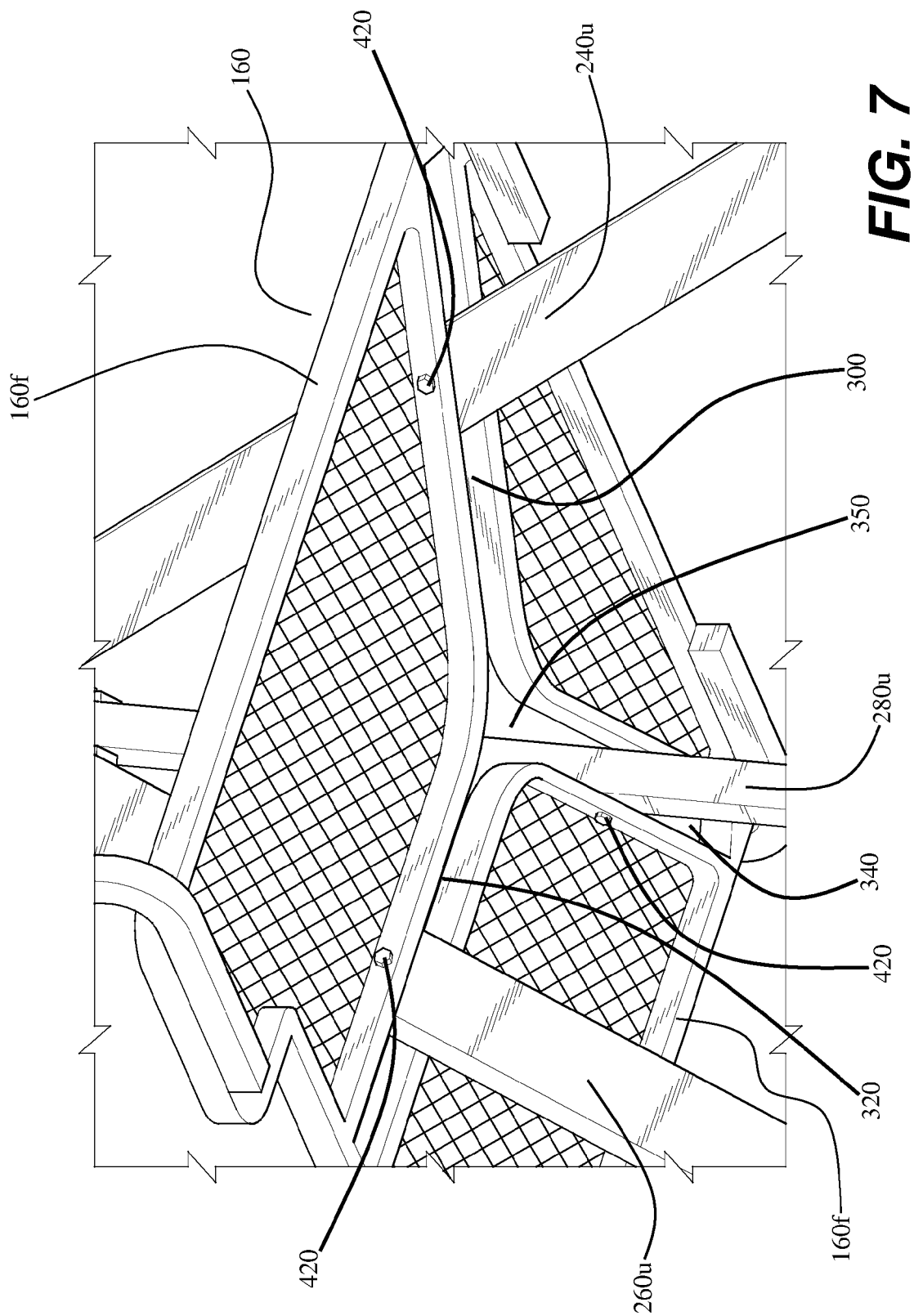
FIG. 7 is a partial perspective view of an observation stand according to the present invention.

Any suitable means can be used to support the platform 160 such as, but not limited to: bolts 420. If used, the bolts 420 are used to affix the upper ends of first 240, second 260 and third 280 legs to the platform 160 as shown in FIG. 7. The bolts 420 fit into bolt holes 440 defined in the upper ends 240*u*, 260*u*, 280*u* of first 240, second 260 and third 280 legs, respectively. Complementary bolt holes 440*c* are located in the platform, and more particularly in the platform-framework 160*f* that forms part of the platform 160 (see, e.g., FIG. 8). The platform 160 is secured to the upper parts of the first 240, second 260 and third 280 legs by aligning the bolt holes 440 and 440*c* and securing bolts 440 therethrough.

All of the U.S. patents cited in the present disclosure (including those U.S. patents cited in the Background and Detailed Description sections) are incorporated by reference herein in their entirety. It will be understood that the present invention is not limited to the embodiments described above, but encompasses any and all embodiments within the scope of the following claims.

I claim:

1. An observation stand, comprising:
a support base having a top end and bottom end, said support base comprising first, second and third legs, wherein said legs are configured in a tripod arrangement, wherein each of said legs have an upper end and a bottom end, wherein the upper end of each leg defines a hole;
a seat, wherein said seat is hingedly attached to the upper end of each leg;
a platform, said platform comprises a platform-framework and first, second and third slots arranged to respectively accommodate the upper end of said first, wherein the first, second and third slots each define depending flange portions of the platform frame-work that respectively border the first, second and third slots, second and third legs each of which define an upper end, wherein said first, second and third slots are located in the same plane and intersect to form an incenter, wherein the upper ends of said first, second and third legs respectively pass through said first, second and third slots to attach directly to said seat, wherein said platform is located proximate to the top end of said support base but below said seat, said platform defines a perimeter, said platform having a platform-framework comprising flange portions depending from a bottom portion of the platform and bordering said first, second and third slots, the platform is affixed to the upper ends of the first, second and third legs by fasteners extending through respective fastener holes defined in the upper ends of the first, second and third legs, and corresponding fastener holes located in respective said flange portions, wherein the platform is affixed to the upper ends of the first, second and third legs by fasteners extending through the holes in the upper ends of each leg and the depending flange portions of the platform-framework that borders the slots, and
a safety-framework attached to the perimeter of said platform, said safety-framework is configured to help prevent a user from falling off said platform,
wherein each of said first, second and third legs is made up of first, second and third tubes, wherein the third tube of each leg telescopes into and from the second tube, and the second tube telescopes into and from the first tube such that the height of the observation stand is at a maximum when the second and third tubes of each leg are telescopically deployed, wherein the observation stand is at a minimum height when the second and third tubes are not telescopically deployed such that the length of each leg corresponds to the length of the first tube of each leg, and at a middle height when the second tube is telescopically deployed while keeping the third tube inside the second tube of each leg.

2. The observation stand according to claim 1, wherein a ground spike is fitted to the bottom end of each leg to enable the bottom end of each leg to be securely attached to the ground.

3. The observation stand according to claim 1, wherein a set of climbing steps is fitted to at least one of said legs.

* * * * *